(12) United States Patent
Holmes, IV et al.

(10) Patent No.: US 6,502,867 B2
(45) Date of Patent: Jan. 7, 2003

(54) FLANGED PIPE FITTING

(75) Inventors: William W. Holmes, IV, Birmingham, AL (US); Daniel A. Copeland, Bessemer, AL (US)

(73) Assignee: United States Pipe & Foundry, Birmingham, AL (US)

( * ) Notice: Subject to any disclaimer, the term of this patent is extended or adjusted under 35 U.S.C. 154(b) by 0 days.

(21) Appl. No.: 09/977,769

(22) Filed: Oct. 15, 2001

(65) Prior Publication Data

US 2002/0017790 A1 Feb. 14, 2002

Related U.S. Application Data

(62) Division of application No. 09/335,298, filed on Jun. 16, 1999.

(51) Int. Cl.[7] .................................................. F16L 21/06
(52) U.S. Cl. ........................ 285/337; 285/104; 285/374; 285/369
(58) Field of Search ................................ 285/369, 337, 285/104, 105, 374, 375

(56) References Cited

U.S. PATENT DOCUMENTS

| 817,300 A | 4/1906 | David |
| 2,780,482 A | 2/1957 | Brown |
| 2,784,990 A | 3/1957 | Pollia |
| 2,832,615 A | 4/1958 | Summers |
| 3,141,686 A | 7/1964 | Smith et al. |
| 3,433,509 A | 3/1969 | Jeffrey et al. |
| 3,578,362 A | 5/1971 | Cauthery |
| 3,582,113 A | 6/1971 | Cauthery |
| 3,589,750 A | 6/1971 | Dunmire |
| 3,659,877 A | 5/1972 | Kubasta |
| 3,737,179 A | 6/1973 | White, Jr. |
| 3,899,183 A | 8/1975 | Wild et al. |
| 3,937,500 A | 2/1976 | Sato |
| 4,068,866 A | 1/1978 | Saha |
| 4,417,754 A | 11/1983 | Yamaji |
| 4,421,347 A | * 12/1983 | Kantor ...................... 285/369 |
| 4,480,861 A | 11/1984 | Cann, Jr. |
| 4,568,112 A | 2/1986 | Bradey et al. |
| 4,575,129 A | 3/1986 | Porowski |
| 4,637,636 A | * 1/1987 | Guest ......................... 285/369 |
| 4,647,083 A | 3/1987 | Hashimoto |
| 4,678,211 A | 7/1987 | Bateman |
| 4,779,900 A | * 10/1988 | Shumard .................... 285/337 |
| 4,834,428 A | 5/1989 | Pritchatt |
| 4,878,698 A | 11/1989 | Gilchrist |
| 4,976,457 A | * 12/1990 | Carter ........................ 285/337 |
| 5,295,697 A | * 3/1994 | Weber ........................ 285/105 |
| 5,297,817 A | 3/1994 | Hodges |
| 5,398,980 A | 3/1995 | Hunter et al. |
| 5,509,699 A | * 4/1996 | Himmelberger ........... 285/337 |
| 6,019,396 A | 2/2000 | Santo |
| 6,231,090 B1 | * 5/2001 | Fukao et al. ............... 285/369 |

* cited by examiner

*Primary Examiner*—Eric K. Nicholson
(74) *Attorney, Agent, or Firm*—Bradley Arant Rose & White LLP

(57) ABSTRACT

A flanged-pipe fitting for joining the plain ends of pipe is described. The fitting comprises a tubular body having an interior cylindrical chamber with a first and second openings, an annular ridge located between the first and second openings, an annular recess for receiving a first sealing gasket and an annular flanged portion having a notch for receiving a second sealing gasket. The flanged-pipe fitting is used in conjunction with a gland fitting to join the two ends of the pipe together.

13 Claims, 2 Drawing Sheets

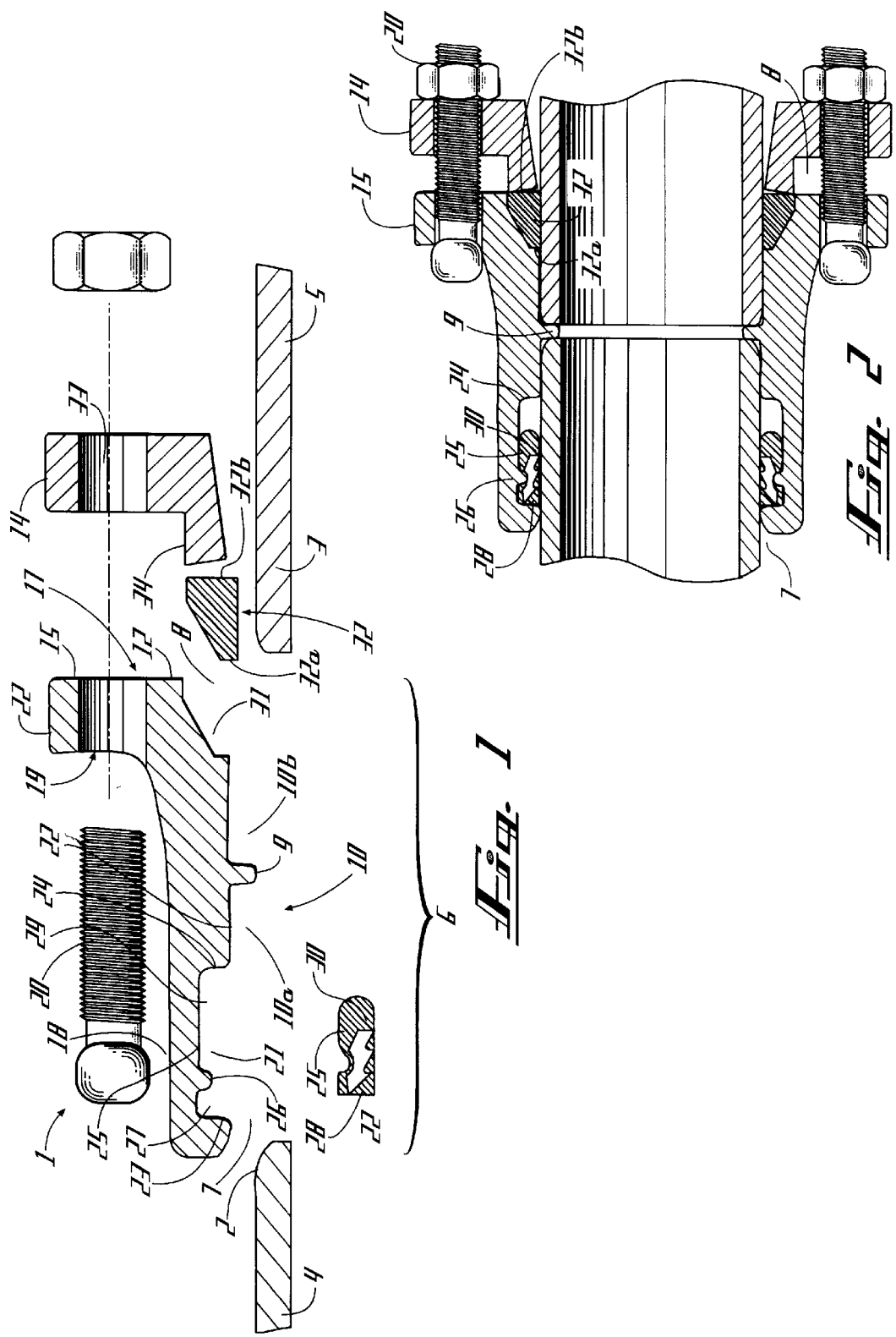

FLANGED PIPE FITTING

This is a divisional of application Ser. No. 09/335,298, filed on Jun. 16, 1999, and claims the benefit of and priority to said Application.

FIELD OF THE INVENTION

The present invention relates to devices used in the pipeline construction industry. More particularly, this invention relates to devices used to join the plain ends of pipe, as well as certain other ends of pipe.

BACKGROUND OF THE INVENTION

Generally speaking, in constructing a pipeline, the ends of two pieces of pipe are axially joined to form a single conduit that is used to transport materials from one point to another. Often times, the materials being transported are fluid or gaseous in nature, and, particularly in those circumstances, it is desired that the pipeline be impervious to leaks. In order to accomplish that goal, and to achieve other objectives which will be herein described, those skilled in the business of pipe and pipeline construction are constantly in search of improved means for securing the joints formed by connecting the ends of pipe together.

There are numerous methods currently in use by those in the pipe and pipeline construction industry to obtain a secure joint. These methods employ different types of components and also can be distinguished by the various ways in which such components are employed. The selection of these different methods will usually depend on the overall design requirements of the pipeline. For instant, as mentioned previously, one important design requirement exists when it is desired that the pipe joints be sealed such that the material being transported within the pipeline can not escape and, conversely, foreign materials are prevented from entering the pipeline.

Another important design requirement exists when it becomes necessary to join the pipe components in a restrained manner. This is usually desired in order to prevent the pipe components from separating due to thrust forces that often occur when the pipeline is subjected to internal pressure, and sometimes, when earth tremors or other external events occur. Still another objective is to make assembly of the pipe joints as simple, economical and reliable as possible.

One current method for connecting pipe together employs the use of flanged fittings and gaskets. These are typical components in rigid piping systems, particularly above-ground systems such as water filtration plants, sewage disposal plants, wastewater treatment plants, pumping stations and chemical plants. Often times, the flanged fitting is threaded directly onto the pipe. This is accomplished by threading the plain end of a pipe (sometimes referred to as the spigot end) and threading a compatibly sized flanged fitting. The threaded flanged fitting is then machine-tightened onto the spigot end of the pipe and is often then transported to the field in this joined condition. In addition, it is common in the industry for the pipe and flanged fitting to have been "faced" after proper tightening of the flanged fitting on the pipe. This is done by excising the portion of the threaded pipe that extends from the face of the flanged fitting such that the face of the flanged fitting is flush with the spigot end of the pipe. The threaded flanged pipe is then connected to another flanged pipe, usually by bolting means. In order to obtain a leak-free joint, a gasket is often used between the faces of the two flanged fittings.

The use of threaded flanged fittings presents several limitations as will now be discussed. The threaded flanged fitting is custom machined to accommodate the exact diameter of the pipe and to provide a smooth surface across the end of the pipe and the face of the flanged fitting. Also, extremely high torques are required to tighten properly the flanged fitting onto the threaded pipe. Consequently, one major limitation of this system is that preparation of the flanged fitting and pipe requires sophisticated machinery not usually available on-site where the finished component will be assembled and installed. If assembled at the pipe manufacturing facility before shipment, the presence of the flanged fitting militates against efficient and space-saving packing and reduces the amount of pipe components which can be transported.

In addition, to assure a proper seal, it is important for the threaded portion of the flanged fitting and pipe to be cleaned of all foreign material such as dirt, sand, grit or rust. The presence of foreign materials such as rust can also increase the amount of torque required to install the flanged fitting onto the pipe. Thus, manufacturing and assembling threaded flanged fittings and threaded pipe is very difficult in the field. Still another limitation of this system is that threaded pipe and threaded flanged fittings are individually mated, and the flanged fittings are not interchangeable. Still another limitation of threaded flanged fitting systems is that the pipe walls must be of substantially greater thickness in order to accommodate the threading which will be machined onto its exterior surface.

An alternative method for joining pipe uses unthreaded flanged fittings which are of appropriate diameter and which are fitted onto pipe ends in facing relationship to one another. As with the threaded flanged fitting, a gasket is often deployed between the faces of the flanged fittings to obtain a sealed joint. This is usually accomplished by bolting the flanged fittings together. In order to secure the flanged fitting to the pipe ends, set screws are inserted radially through the collar of the flange into the exterior surface of the pipe ends. One such example of this type of apparatus is disclosed in U.S. Pat. No. 4,480,861, issued Nov. 6, 1984, to Frank E. Cann.

Although the device disclosed by Cann solves some of the problems presented by use of a threaded flanged fitting, it is not without problems of its own. For instance, the flanged fitting in Cann's device must be mated to one another and therefore limits the choices for joining pipe by those in the field. In addition, as those skilled in the art will appreciate, those assembling the flanged fitting in Cann's device must be skilled in recognizing the extent to which the set screws should be tightened. Unless care is used in tightening the set screws, they can often damage and even puncture the pipe end. Conversely, if not sufficiently tightened, the set screws used in Cann's device will cause the flanged fitting to become unstable or dislodged altogether.

A second common method for connecting the ends of pipe involves inserting the spigot end of one pipe into the expanded end of a second pipe the interior profile of which has been specially fabricated to form a socket (the expanded end sometimes being referred to as the "bell end"). The bell end is sized to accommodate the spigot end of the pipe to be received. The connection obtained by this method is also known in the industry as a "push-on joint."

There are several methods used to seal and/or secure the push-on joint. One such method involves inserting a fitted gasket within an annular recess formed within the throat of the socket of the bell. On such gasket is described in U.S.

Pat. No. 2,953,398, issued Sep. 20, 1960, to L. Haugen and C. Henrikson. After the gasket is inserted into the annular recess of the socket, the spigot is aligned and forced through the gasket into the bottom of the socket, thereby compressing the gasket and sealing the two pipe ends together.

In order to restrain the spigot within the bell, a specially designed gasket is sometimes used. One such gasket employs stainless steel locking segments vulcanized circumferentially into the gasket as described in U.S. Pat. Nos. 5,295,697 and 5,464,228, issued to J. Weber and L. Jones on Mar. 22, 1994 and Nov. 5, 1995, respectively. The locking segments extend from the interior surface of the gasket, away from the interior surface of the bell end, such that they grip the spigot end of the inserted pipe when the pipeline is subjected to internal pressures.

Still another common method for connecting pipe is sometimes referred to as mechanical joint pipe. The bell end of a pipe has a flanged portion cast on it. The spigot end of a second pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The gland fitting also has an integrally formed, protruding lip which encircles the face of the gland fitting at its inside diameter such that the lip is adjacent to the surface of the pipe and faces the spigot end of the pipe when the gland fitting is positioned on the pipe. The face of the flanged portion has a tapered notch designed to receive the conically-shaped gasket when the spigot end is inserted into the bell. The joint is formed when the spigot is axially inserted into the bell, and the gland fitting and the flanged portion are bolted together, causing the lip of the gland fitting to compress the gasket thus sealing the two pipe pieces. Examples of this type of apparatus is disclosed in U.S. Pat. No. 5,398,980, issued Mar. 21, 1995, to T. Hunter, O. Jackson and M. Pannell; in U.S. Pat. No. 4,878,698, issued Nov. 7, 1995, to R. Gilchrist; and in U.S. Pat. No. 2,832,615, issued Apr. 29, 1958 to A. Summers. Although each of these devices embodies a system that purports to couple pipes in sealing relation to one another, each system requires that conventional metal pipe bells be used, thus limiting the flexibility of those assembling the pipeline, and increasing the transportation and storage difficulties incurred by the pipeline assemblers. There is, consequently, a need in the industry for a compact, lightweight, easy to install pipe fitting which converts plain pipe to various pipe joint configurations such as a flanged or a mechanical joint.

The present invention embodies a significant advancement in the field of pipe manufacture and assembly. The new fitting can be used on standard pipe which needs no special preparation such as welding or threading prior to attachment. As a one-piece pipe fitting, the flanged pipe fitting described herein is simple to manufacture (and therefore economical), is easy to assemble in the field, and is equally or more stable and secure than other alternatives now available. By accomplishing these and other objectives, the disclosed flanged pipe fitting offers those in the business of constructing pipelines with a valuable new component for connecting pipe ends.

SUMMARY OF THE INVENTION

The improvements described herein have been achieved in a new flanged pipe fitting to be used in receiving and joining a first pipe and a second pipe. It will be appreciated by those skilled in the art that the fitting is best utilized to mate with a compatible pipe fitting such as a gland fitting attached to another pipe in order to obtain the coupling properties of a standard mechanical joint. The flanged pipe fitting disclosed is a one-piece, tubular casting having an internal chamber and first and second openings at the first and second extremities, respectively, of said tubular casting. The tubular casting is fabricated such that the internal chamber forms a double socket for receiving the spigot ends of pipes. This double socket configuration is accomplished by fabricating an inwardly protruding, annular ridge on the interior surface of the tubular casting and at a point roughly equidistant from the two extremities of the tubular casting thereby forming two socket separated by a cylindrical opening of slightly smaller diameter than the diameter of the spigot ends of pipes to be inserted through the first and second openings at the extremities of the tubular casting.

The surface of the internal chamber is further fabricated such that the throat of at least one of the two sockets formed therein contains an annularly recessed channel designed to receive an internal, cylindrical gasket for sealing, and where desired, for restraining purposes when used to form a push-on joint. One such gasket is disclosed in U.S. Pat. No. 5,464,228.

The tubular casting has a shoulder, or flanged portion, extending radially outward at a substantially right angle to form a cylindrical face encircling the tubular casting. In the preferred embodiment, the flanged portion is located at the extremity of the tubular casting that is farthest from the annular recessed channel, thereby facilitating coupling with the second pipe to be inserted into opening of the tubular casting opposite from the end having the annular recessed channel. The external face of the flanged portion has fabricated at its internal diameter a notch that is tapered perpendicularly from the external face of the flanged portion. It will be appreciated that, so configured, the notch is designed to receive a complementally-shaped gasket used to form mechanical joint pipe when the flanged portion is mated with an appropriately sized gland fitting slidably attached along with the gasket to the spigot end of the second pipe. In a preferred embodiment, the face of the flanged portion has a plurality of apertures for receiving bolts or other connecting means in order to secure the fitting to the appropriately sized and positioned gland. It will be understood by those in the industry that alternative means exist for securing pipe fittings together, and the present invention is not restricted to the use of bolts and bolt apertures.

The new pipe fitting facilitates connections between pipe in the field without the need for sophisticated and time-consuming machining. Also, because the ridge and the recessed channel are fabricated within the new flange component before the joint is assembled, the location of the gasket and the extent to which the spigot must be inserted into the flange component is predetermined, thus eliminating the need for making precise measurements as is required by the invention disclosed by U.S. Pat. No. 3,589,750, issued Jun. 29, 1971 to P. Dunmire. These same features of the present invention also reduce substantially the possibility that the gasket will be displaced or damaged during assembly as is the case with Dunmire. Thus, the instant invention provides a significant improvement over current devices because it is makes assembly of pipeline more efficient, economical and error-free.

BRIEF DESCRIPTION OF THE DRAWINGS

The foregoing and other objects or features and advantages of the present invention will be made apparent from the detailed description of the preferred embodiments of the invention and from the following list of drawings which are for illustration purposes and are not to scale:

FIG. 1 is an exploded vertical cross sectional view of the present invention.

FIG. 2 is an assembled vertical cross sectional view of the present invention.

DETAILED DESCRIPTION OF THE INVENTION

Figure 3:
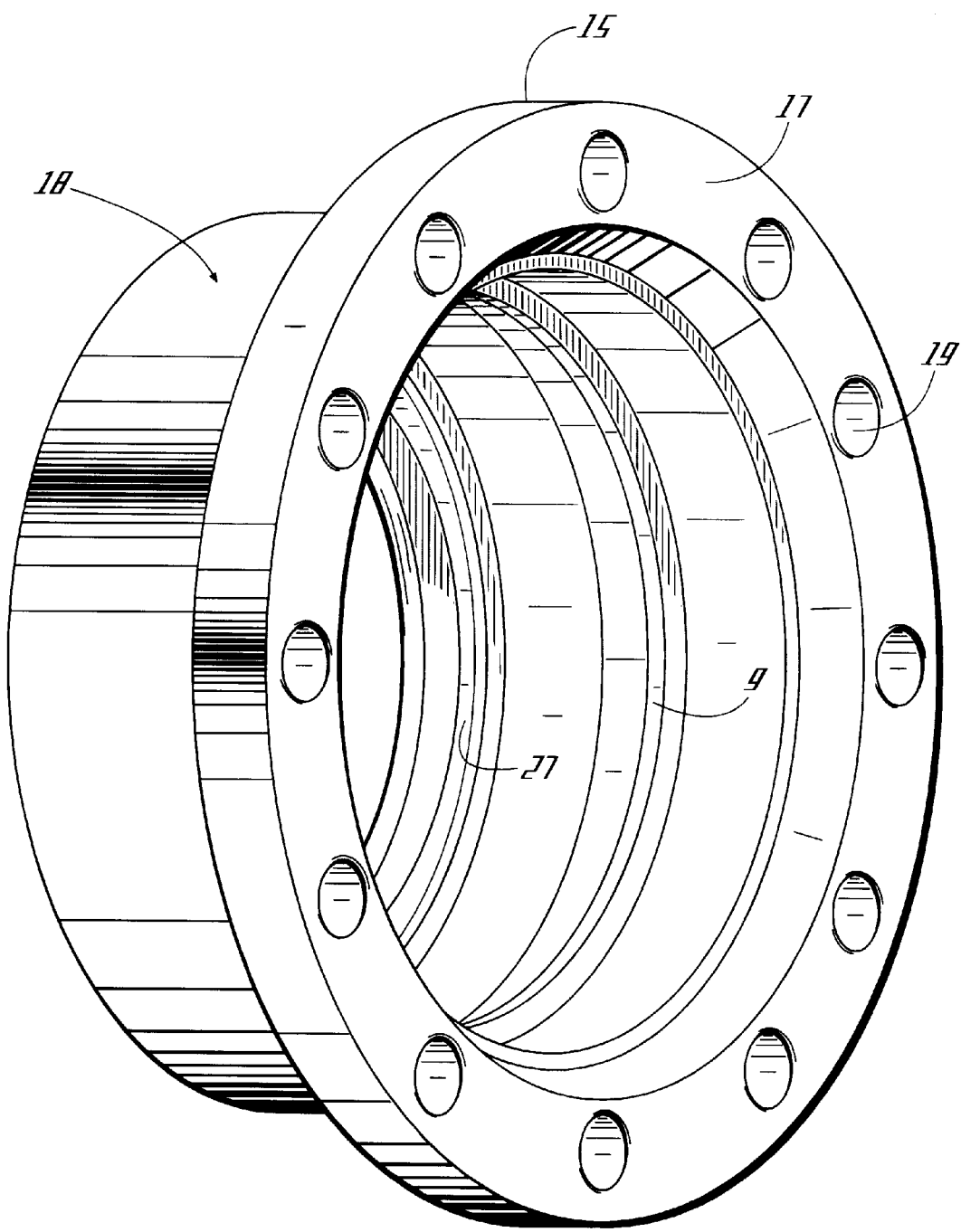
FIG. 3 is a perspective view of the present invention.

Referring to FIGS. 1, 2 and 3, the new flanged pipe fitting 1 is an apparatus for joining the two spigot ends 2 and 3 of cylindrical pipes 4 and 5 together. The flanged pipe fitting comprises a tubular body 6 having an internal chamber 10 and first 7 and second 8 cylindrical openings at the first and second extremities, respectively, of said tubular body 6.

An inwardly protruding, annular ridge 9 is located at a point along the internal surface of the interior chamber 10 of tubular body 6. Although the location of annular ridge 9 need not be defined with precision, it will be understood that the annular ridge 9 must be a sufficient distance from either extremity of the tubular body to permit a sufficient amount of the pipe ends to be inserted in order to form a stable joint. It will be apparent that, so configured, two sockets 10a and 10b in facing relationship are formed within the chamber 10 of the tubular body 6, said two sockets 10a and 10b being separated by said annular ridge 9. The cylindrical opening formed by annular ridge 9 is sufficiently smaller than the diameter of the spigot ends 2 and 3 of respective pipes 4 and 5 to be received so that the spigot ends 2 and 3 seat against either side of annular ridge 9 when fully inserted into the chamber of the tubular body.

An annular recess 21 circumscribes the throat of socket 10a at a point between the first opening 7 of the tubular body 6 and annular ridge 9. The annular recess 21 is shaped to receive an internal sealing gasket 22, shown in FIG. 1, of dimensions corresponding to the dimensions of annular recess 21. Referring to FIG. 1, the profile of the annular recess 21 will be determined by the exterior profile of the internal sealing gasket 22 to be used. The preferred embodiment shown in FIG. 1 configures the annular recess 21 to be compatible with a gasket such as that described in U.S. Pat. No. 5,464,228 and U.S. Pat. No. 2,953,398. More particularly, the annular recess 21 is defined by a front radial wall 23 and a rear radial wall 24 which are joined by a third wall 25, said third wall being substantially parallel with the surface of the throat 22 of the socket. Said third wall 25 is divided into two compartments by a small annular protrusion 26 extending inwardly from the third wall 25 of the recess. The first compartment 27 is generally smaller than the second compartment 29 and serves as a retainer seat to receive the heel 28 of the gasket 22. The second compartment 29 of the annular recess is fabricated for receiving the bulb 30 of the gasket as it is compressed by the insertion of the spigot end 2 of the pipe 4, as reflected in FIG. 2.

Referring to FIGS. 1 and 2, the tubular body 6 has an annular flanged portion 15 extending outwardly to form an annular flange face 17 that is roughly perpendicular to the exterior surface 18 of the tubular body 6. In a preferred embodiment, the annular flange face 17 has a plurality of apertures 19 that are generally parallel to the axis of the tubular body and distanced sufficiently from the exterior surface 18 of the tubular body 6 to permit the annular flanged portion 15 to be affixed by bolting or other appropriate means 20 to a flanged or gland fitting 14 attached to a second pipe 5 as described more fully below. The annular flange 15 is able to be positioned at any point along the exterior surface 18 of the tubular body 6. However, a preferred embodiment locates the annular flanged portion at the extremity of said second opening 8 of the tubular body 6. In the preferred embodiment, the surface of the annular flange face 17 has fashioned at its internal diameter, substantially at the juncture of said tubular body and said annular flanged portion, a notch 31 that is tapered in a direction substantially perpendicular to the surface of annular flange face 17. It will be appreciated that, so configured, the notch is designed to receive a complementally-shaped, external gasket, such as external gasket 32 shown in FIGS. 1 and 2, when the flanged portion 15 is mated with gland 14. It will be appreciated by those skilled in the industry that a conically-shaped gasket is often employed.

Referring to FIG. 2, assembly of the pipe joint using the invention is disclosed. The appropriate internal sealing gasket 22 is inserted into annular recess 21 with the heel 28 of the internal sealing gasket 22 in first compartment 27 of the annular recess 21 of the socket 10a. The spigot end 2 of the pipe 4 is axially inserted through the first cylindrical opening 7 of the first extremity of the tubular body 6. The spigot end 2 is then forcibly inserted beyond the internal sealing gasket 22 until the spigot end 2 of the pipe 4 makes contact with the annular ridge 9.

Spigot end 3 of a second pipe 5 is fitted with gland fitting 14 and external gasket 32 that is conically shaped such that one face 32a of the gasket is diametrically larger than the second face 32b of the gasket. Gland fitting 14 has a plurality of apertures 33 that are complementally aligned with the apertures 19 of the flanged portion of tubular body 6. The gland fitting 14 also has an integrally formed, protruding ridge 34 which encircles the face of gland fitting 14 at its inside diameter such that the ridge is adjacent to the external surface of second pipe 5 and faces the spigot end 3 of second pipe 5 when gland fitting 14 is positioned to be attached to the flanged pipe fitting. The mechanical joint is formed when spigot end 3 is axially inserted through the second cylindrical opening 8 of the second extremity of the tubular body 6 and gland fitting 14 and the flanged portion 15 are connected by bolting means 20 or other connecting means. It will be appreciated that the tightening of bolting means 20 will cause ridge 34 of gland fitting 14 to compress gasket 32 into the notch 31 of flange portion 15, thus sealing tubular body 6 to second pipe 5.

While the preferred embodiments of the present invention are shown and described, it is envisioned that those skilled in the art may devise various modifications of the present invention without departing from the spirit and scope of the claims. The invention is not intended to be limited by the foregoing disclosure, but only by the following claims.

We claim:

1. A non-symmetrical flanged pipe fitting for receiving and joining a first pipe and a second pipe, the flanged pipe fitting comprising:
    (a) a tubular body having an interior cylindrical chamber, the tubular body having a first opening at a first extremity and a second opening at a second extremity, the first opening and the second opening capable of receiving the first pipe and the second pipe axially inserted there through;
    (b) a continuous annular ridge located within the interior cylindrical chamber between the first and second openings, such that the first and second pipes, when inserted into the interior cylindrical chamber, are separated by the annular ridge;

c) an annular recess completely enclosed within the interior cylindrical chamber between the first opening and the continuous annular ridge, the annular recess having at least a front radial wall and a rear radial wall and a third wall joining the front and rear walls;

(d) a first sealing gasket for insertion in the annular recess; and (e) an annular flanged portion extending substantially radially from an exterior surface of the tubular body proximate to the second opening, the annular flange further having a plurality of apertures therein and a tapered notch substantially at the juncture of the tubular body and the annular flange, said notch being capable of receiving a second sealing gasket.

2. The flanged pipe fitting according to claim 1 wherein an interior profile of the annular recess is configured to correspond to an external profile of the first sealing gasket.

3. The flanged pipe fitting according to claim 1, wherein (a) the annular recess comprises a front radial wall, a rear radial wall and a third wall joining the front and rear radial walls, the third wall having a continuous annular protrusion extending inwardly from the third wall dividing the annular recess into a first and a second compartment; and (b) the first sealing gasket comprises a heel potion seated in the first compartment, and a bulb seated in the second compartment.

4. The flanged pipe fitting according to claim 1, wherein the flanged portion has a plurality of apertures therein.

5. The flanged pipe fitting according to claim 1 wherein the second sealing gasket is compatibly shaped to seat within said notch.

6. The flanged pipe fitting according to claim 1, wherein the notch is tapered and the second sealing gasket is conically shaped.

7. A pipe joint, comprising:

(a) a flanged pipe fitting for receiving and joining a first pipe and a second pipe, the flanged pipe fitting comprising:

ii. a tubular body having an interior cylindrical chamber, the tubular body having a first opening at a first extremity and a second opening at a second extremity;

ii. a continuous annular ridge located within the interior cylindrical chamber between the first and second openings;

iii. an annular recess completely enclosed within the interior cylindrical chamber between the first opening and the continuous annular ridge, the annular recess having at least a front radial wall and a rear radial wall and a third wall joining the front and rear walls;

iv. a first sealing gasket inserted in the annular recess; and v. an annular flange extending substantially radially from an exterior surface of the tubular body proximate to the second opening, the annular flange further having a notch substantially at the juncture of the tubular body and the annular flange, said notch being capable of receiving a second sealing gasket;

(b) the first pipe having a first spigot end, the first spigot end inserted through the first opening, beyond the first sealing gasket so that at least a portion of the internal gasket is compressed is compressed into the annular recess;

(c) the second pipe having a second spigot end, the second spigot end inserted through the second opening;

(d) a second sealing gasket slidably secured to the second spigot end of the second pipe;

(e) a gland fitting slidably secured to the second spigot end of the second pipe, the gland fitting having a protruding ridge encircling the face of the gland fitting at its inside diameter; and (f) a bolting means to secure the annular flange of the tubular body to the gland fitting so that the protruding ridge of the gland fitting compresses the second sealing gasket as the annular flange and the gland fitting are secured by the bolting means.

8. The pipe joint according to claim 7, wherein the notch is tapered and the second sealing gasket is compatibly shaped to seat within the notch.

9. The flanged pipe fitting according to claim 7, wherein the notch is tapered and the second sealing gasket is conically shaped.

10. The pipe joint according to claim 7 wherein an interior profile of the annular recess is configured to correspond to an external profile of the first sealing gasket.

11. The pipe joint according to claim 7, wherein (a) the annular recess comprises a front radial wall, a rear radial wall and a third wall joining the front and rear radial walls, the third wall having a continuous annular protrusion extending inwardly from the third wall dividing the annular recess into a first and a second compartment; and (b) the first sealing gasket comprises a heel potion seated in the first compartment, and a bulb seated in the second compartment.

12. The pipe joint according to claim 7, wherein the flanged portion and the gland fitting each have a plurality of apertures therein, the apertures of the gland fitting being aligned with apertures of the flanged portion.

13. The pipe joint according to claim 7 where the bolting means is nuts and bolts.

* * * * *